(12) United States Patent
Kalinina

(10) Patent No.: US 9,881,083 B2
(45) Date of Patent: Jan. 30, 2018

(54) METHOD OF AND A SYSTEM FOR INDEXING AUDIO TRACKS USING CHROMAPRINTS

(71) Applicant: YANDEX EUROPE AG, Lucerne (CH)

(72) Inventor: Elena Andreevna Kalinina, Sarov (RU)

(73) Assignee: YANDEX EUROPE AG, Lucerne (CH)

( * ) Notice: Subject to any disclaimer, the term of this patent is extended or adjusted under 35 U.S.C. 154(b) by 60 days.

(21) Appl. No.: 15/110,134

(22) PCT Filed: Mar. 3, 2015

(86) PCT No.: PCT/IB2015/051556
§ 371 (c)(1),
(2) Date: Jul. 7, 2016

(87) PCT Pub. No.: WO2016/024171
PCT Pub. Date: Feb. 18, 2016

(65) Prior Publication Data
US 2016/0328472 A1 Nov. 10, 2016

(30) Foreign Application Priority Data

Aug. 14, 2014 (RU) ................................ 2014133401
Feb. 16, 2015 (RU) ................................ 2015105099

(51) Int. Cl.
*G06F 17/30* (2006.01)
*G11B 27/28* (2006.01)
(Continued)

(52) U.S. Cl.
CPC .. *G06F 17/30778* (2013.01); *G06F 17/30743* (2013.01); *G10L 19/018* (2013.01); *G11B 27/28* (2013.01); *G11B 27/329* (2013.01)

(58) Field of Classification Search
CPC ................................................. G06F 17/30784
See application file for complete search history.

(56) References Cited

U.S. PATENT DOCUMENTS 6,963,975 B1 11/2005 Weare
6,990,453 B2 1/2006 Wang et al.
(Continued)

FOREIGN PATENT DOCUMENTS

CN 101673266 B 9/2012
EP 1760693 B1 7/2008
(Continued)

OTHER PUBLICATIONS

Kurth et al., Efficient Index-Based Audio Matching, IEEE, Feb. 2008.*
(Continued)

*Primary Examiner* — Brittany N Allen
(74) *Attorney, Agent, or Firm* — BCF LLP

(57) ABSTRACT

A non-transient computer information storage medium storing an audio track inverted index, and method of its creating and maintaining, the audio track inverted index comprising a plurality of sets of posting lists, each posting list within the plurality of sets of posting lists being a posting list of chroma words, each chroma word being a component of an audio fingerprint, each of chroma words being split into a plurality of bytes, each of chroma words comprising a beginning portion of the chroma word, the beginning portion of the chroma word being a sub-plurality of bytes having a first byte and a following byte, the following byte located immediately after said first byte; within a given set of posting lists of the plurality of postings lists: each posting list contains chroma words having the same first byte within the beginning portion of the chroma word, and a first one of the plurality of posting lists being different from a second one of the plurality of posting lists by the associated chroma words
(Continued)

having a different following byte, the different following byte being unique for the given set of posting lists. Validation index comprising key file and fingerprint file.

15 Claims, 7 Drawing Sheets

(51) Int. Cl.
*G11B 27/32* (2006.01)
*G10L 19/018* (2013.01)
*G06F 15/16* (2006.01)

(56) References Cited

U.S. PATENT DOCUMENTS

| | | |
|---|---|---|
| 7,080,253 B2 | 7/2006 | Weare |
| 7,444,353 B1 | 10/2008 | Chen et al. |
| 7,512,886 B1 | 3/2009 | Herberger et al. |
| 7,516,074 B2 | 4/2009 | Bilobrov |
| 8,238,669 B2 | 8/2012 | Covell et al. |
| 8,275,625 B2 | 9/2012 | Dietrich et al. |
| 8,311,828 B2 | 11/2012 | Arrowood et al. |
| 8,380,518 B2 | 2/2013 | Kim et al. |
| 8,386,494 B2 | 2/2013 | Vachuska |
| 8,497,417 B2 | 7/2013 | Lyon et al. |
| 8,586,847 B2 | 11/2013 | Ellis et al. |
| 8,589,171 B2 | 11/2013 | Savenok et al. |
| 2002/0069073 A1 | 6/2002 | Fasciano |
| 2007/0282860 A1 | 12/2007 | Athineos et al. |
| 2009/0055351 A1 | 2/2009 | Whitehorn et al. |
| 2011/0173185 A1 | 7/2011 | Vogel et al. |
| 2012/0136701 A1* | 5/2012 | Relan .................... G06Q 30/02 705/14.4 |
| 2012/0136756 A1 | 5/2012 | Jitkoff et al. |
| 2012/0209612 A1 | 8/2012 | Bilobrov |
| 2013/0138442 A1 | 5/2013 | Wang et al. |
| 2013/0139674 A1 | 6/2013 | Whitman et al. |
| 2013/0148939 A1* | 6/2013 | Beattie, Jr. ............... H04N 9/79 386/230 |
| 2013/0160038 A1 | 6/2013 | Slaney et al. |
| 2013/0191122 A1 | 7/2013 | Mason |
| 2013/0259211 A1 | 10/2013 | Vlack et al. |
| 2014/0067373 A1 | 3/2014 | Wasserblat et al. |

FOREIGN PATENT DOCUMENTS

| | | |
|---|---|---|
| EP | 1397756 B1 | 12/2010 |
| EP | 2183744 B1 | 9/2014 |
| EP | 2324440 B1 | 10/2014 |
| GB | 2494511 B | 9/2013 |
| RU | 2459281 C1 | 9/2011 |
| WO | 03030522 A1 | 4/2003 |
| WO | 2005101243 A1 | 10/2005 |
| WO | 2007133754 A2 | 11/2007 |
| WO | 2008127052 A1 | 10/2008 |
| WO | 2009026564 A1 | 2/2009 |
| WO | 2009032672 A1 | 3/2009 |
| WO | 2011087756 A1 | 7/2011 |
| WO | 2011091402 A1 | 7/2011 |
| WO | 2012078142 A1 | 6/2012 |
| WO | 2012108975 A2 | 8/2012 |
| WO | 2014004914 A1 | 1/2014 |

OTHER PUBLICATIONS

Lalinsky, How does Chromaprint work, Jan. 18, 2011.*
Lukáš Lalinsk, Inside the Acoustid server, Dec. 15, 2011.*
International Search Report and Written Opinion from PCT/IB2015/051556, dated Jul. 1, 2015, Shane Thomas.
International Preliminary Report on Patentability from PCT/IB2015/051556, dated Jan. 28, 2016, Robert Chevalier.
Bertocco, Content-based Music Access: Combining Audio Features and Semantic Information for Music Search Engines, Jan. 31, 2011.
English abstract of CN101673266 retrieved from Espacenet dated Apr. 20, 2016.
U.S. Appl. No. 15/103,994, filed Jun. 13, 2016.

* cited by examiner

METHOD OF AND A SYSTEM FOR INDEXING AUDIO TRACKS USING CHROMAPRINTS

CROSS-REFERENCE

The present application claims priority to Russian Patent Application No. 2014133401, filed Aug. 14, 2014 and Russian Patent Application No. 2015105099, filed Feb. 16, 2015, entitled "A METHOD OF AND A SYSTEM FOR INDEXING AUDIO TRACKS USING CHROMAPRINTS" the entirety of which is incorporated herein.

FIELD

The present technology relates to a method of and a system for indexing audio tracks using chromaprints.

BACKGROUND

There are two aims of audio file recognition: recognition of pieces of audio recordings, and matching of complete audio tracks.

Recognition technology is used for identifying of an audio recording by usage of a relatively short but potentially corrupted and noisy fragment of the audio track. A representative example is Shazam, which is a commercial smartphone-based music recognition service. Shazam uses a smartphone's built-in microphone to gather a brief sample of music being played. It creates an audio fingerprint based on the sample, and compares it against a database. Once the recognition is made, there is no need for any further processing, such as additional comparison of the matched file found in the database. Therefore, when a user is listening to a mix of melodies and tries to identify the melody, Shazam would identify the name of the actually playing piece of music.

Matching technology is aimed for the search of duplicates. Therefore, the duplicate of a mix of compositions would be the same mix of the same compositions. However, audio tracks can be deemed being duplicates when the difference between them consists in a slight duration difference, in a slight time shift, or in quality.

Since matching technology is aimed for the search of duplicates, comparison of larger portions of audio fingerprints is necessary. Comparison of larger portions of audio fingerprints is computer resource consuming (such as processing power, etc.).

SUMMARY

It is an object of the present technology to ameliorate at least some of the inconveniences present in the prior art.

In one aspect, implementations of the present technology provide a computer-implemented method of matching of a first incoming audio track with an indexed audio track. The method is executable at a server. The method comprises: (1) selecting the indexed audio track as a candidate audio track from a plurality of indexed audio tracks, the selecting by executing steps of: (a) determining a first short audio fingerprint, the first short audio fingerprint being an audio fingerprint of a first portion of the first incoming audio track, the first short audio fingerprint comprising a first chroma word, the first portion of the first audio track being of a first predetermined duration from a start of the first incoming audio track; (b) determining the candidate audio track from a set of indexed audio tracks, the candidate audio track having a second short audio fingerprint that contains a second chroma word, a beginning portion of the second chroma word being identical to a beginning portion of the first chroma word, the second short audio fingerprint being an audio fingerprint of a first portion of the candidate audio track, the first portion of the candidate audio track being of the first predetermined duration from a start of the candidate audio track; (2) validating the candidate audio track against the first audio track by executing steps of: (a) determining a first long audio fingerprint, the first long audio fingerprint being an audio fingerprint of a second portion of the first incoming audio track; (b) retrieving a second long audio fingerprint, the second long audio fingerprint being an audio fingerprint of a second portion of the candidate audio track; each of the second portion of the first audio track and the second portion of the candidate audio track are of a second predetermined duration from the start of the respective one of the first audio track and the candidate audio track; each of the first portion of the respective one of the first audio track and the candidate audio track being fully contained within the second portion of the respective one of the first audio track and the candidate audio track performing bit-by-bit comparing of the first long audio fingerprint with the second long audio fingerprint.

In some implementations, a beginning portion of the chroma word comprises a combination of (i) any one of a first byte and a first multi-byte sequence, the first multi-byte sequence being the sequence of bytes in the beginning of the beginning portion of the respective chroma word, the first multi-byte sequence having a pre-determined number of bytes, and (ii) any one of a following byte and a second multi-byte sequence, the second multi-byte sequence being the sequence of bytes following any one of the first multi-byte sequence and the first byte of each respective chroma word, the second multi-byte sequence having the pre-determined number of bytes.

In some implementations, the first predetermined duration is lesser one of: a predetermined duration within a time range from 9 to 27 second, and a respective audio track duration.

In some implementations, the first predetermined duration is lesser one of: 21 second, and a respective audio track duration.

In some implementations, the second predetermined duration is lesser one of: a predetermined duration within a time range from 96 to 141 second, and a respective audio track duration In some implementations, the second predetermined duration is lesser one of: 120 seconds, and a respective audio track duration.

In some implementations, each of the first chroma word and the second chroma word describes a chunk of a respective audio track, duration of the chunk of the audio track being within time range from ½ second to 8 second.

In some implementations, the method further comprises generating said first chroma word and said second chroma word.

In some implementations, each of the first and second chroma words contains an indication of a track ID associated with the respective audio track.

In some implementations, each of the chroma words contains an indication of a track duration information associated with a respective audio track.

In some implementations, the track ID is described with a third multi-byte sequence which follows any one of (i) the following byte, and (ii) the second multi-byte sequence.

In some implementations, the indication of a track duration is described with one byte which follows any one of (i) the following byte, and (ii) the second multi-byte sequence.

In some implementations, the determining candidate audio track comprises comparing respective track duration of the first incoming audio track and the candidate audio track.

In some implementations, the method further comprises determining that the candidate audio track is not a matched candidate to the first incoming audio track responsive to the track duration varying by more than a pre-set value In some implementations, the candidate audio track comprises a plurality of candidate audio tracks and wherein the method further comprises selecting a sub-set of the plurality of candidate audio tracks based on a pre-set candidate threshold number.

In some implementations, the bit-by-bit comparing of the first long audio fingerprint with the second long audio fingerprint comprises shifting the first long audio fingerprint relative to the second long audio fingerprint.

In some implementations, the shifting comprises an amplitude of a shift, and wherein the amplitude ranges between plus 20 seconds and minus 20 seconds.

In some implementations, the determining, that the beginning portion of the second chroma word is identical to the beginning portion of the first chroma word is executed by determining that an entire sequence of bytes in the beginning portion of the second chroma word matches an entire sequence of bytes in the beginning portion of the first chroma.

In some implementations, at least one of the short audio fingerprint and the long audio fingerprint contains an indication of a track ID associated with a respective audio track.

In some implementations, method further comprises, prior to the determining the first short audio fingerprint, receiving, by the server, at least a portion of the first incoming audio track.

In some implementations, retrieving of the second short audio fingerprint comprises retrieving using an index.

In some implementations, the index is the audio track inverted index.

In some implementations, the audio track inverted index is any one of (i) a pruning index, the pruning index being built for a plurality of short audio fingerprints, and (ii) a validation index, the validation index being built for a plurality of long audio fingerprints.

In another aspect, implementations of the present technology provide a non-transient computer information storage medium. The non-transient computer information storage medium stores an audio track inverted index. The audio track inverted index comprises: a plurality of sets of posting lists, each posting list within the plurality of sets of posting lists being a posting list of chroma words, each chroma word being a component of an audio fingerprint; each of the chroma words being split into a plurality of bytes, each of chroma words comprising a beginning portion of the chroma word, the beginning portion of the chroma word being a sub-plurality of bytes having a first byte and a following byte, the following byte located immediately after the first byte; within a given set of posting lists of the plurality of postings lists: each posting list contains chroma words having the same first byte within the beginning portion of the chroma word, and a first one of the plurality of posting lists being different from a second one of the plurality of posting lists by the associated chroma words having a different following byte, the different following byte being unique for the given set of posting lists.

In some implementations, each of the given sets of posting lists is associated with an index key, the index key being unique within the plurality of sets of posting lists.

In some implementations, the index key is for quick location of the given set of posting lists within the index.

In some implementations, each of the posting lists within the given set of posting lists is associated with a sorting key, the sorting key being unique for the given set of posting lists.

In some implementations, the sorting key is for quick location of the posting list within the given set of posting lists.

In some implementations, the first byte is a first multi-byte sequence, the first multi-byte sequence being the sequence of bytes in the beginning of the beginning portion of each respective chroma word, the number of bytes in each first multi-byte sequence being the same.

In some implementations, the index key comprises the first multi-byte sequence.

In some implementations, the following byte is a second multi-byte sequence, the second multi-byte sequence being the sequence of bytes following any one of the first byte and the first multi-byte sequence of each respective chroma word.

In some implementations, the number of bytes in each second multi-byte sequence is the same.

In some implementations, the first multi-byte sequence is a sequence of three bytes.

In some implementations, the beginning portion of each chroma word has a predetermined number of bytes.

In some implementations, the beginning portion of each chroma word has four bytes.

In some implementations, each of the given sets of posting lists being associated with an index key, the index key being unique within the plurality of sets of posting lists and each of the posting lists within the given set of posting lists being associated with a sorting key, the sorting key being unique for the given set of posting lists.

In some implementations, the audio fingerprint is any one of (i) a short audio fingerprint, the short audio fingerprint being an audio fingerprint of a first portion of an audio track, the first portion of the audio track being of a first predetermined duration from a start of the audio track, and (ii) a long audio fingerprint, the long audio fingerprint being an audio fingerprint of a second portion of an audio track, the second portion of the audio track being of a second predetermined duration from the start of the audio track.

In some implementations, at least one of the short audio fingerprint and the long audio fingerprint contains a track ID.

In some implementations, the one of the short audio fingerprint and the long audio fingerprint is stored in an audio track inverted index being implemented as one of: (i) a pruning index, the pruning index being built for a plurality of short audio fingerprints, and (ii) a validation index, the validation index being built for a plurality of long audio fingerprints.

In yet another aspect, implementations of the present technology provide a method of creating and maintaining an audio track inverted index, the method comprises: (i) receiving an audio track to be indexed; (ii) determining a first chroma word associated with the new audio track to be indexed, the first chroma word being split into a plurality of bytes, the first chroma words comprising a beginning portion of the chroma word, the beginning portion of the chroma word being a sub-plurality of bytes having a first byte and a following byte, the following byte located immediately after the first byte; (iii) based on the first byte, determining a specific set of postings lists within a plurality of sets of posting lists, the specific one within the plurality of sets of posting lists containing posting lists having references for chroma words sharing the same first byte; (iv) responsive to the second byte of the first chroma word matching any second byte of any chroma words stored in a given posting list within the specific set of posting lists, storing an indication of the first chroma word in the given posting list; (v) responsive to the second byte of the first chroma word not matching any second byte of any chroma words stored in the posting lists, creating a new posting list within the specific set of posting lists storing an indication of the first chroma word.

In some implementations, the first byte is a first multi-byte sequence, the first multi-byte sequence being the sequence of bytes in the beginning of the beginning portion of the new chroma word, the number of bytes being pre-determined.

In some implementations, the following byte is a second multi-byte sequence, the second multi-byte sequence being the sequence of bytes following any one of the first multi-byte sequence and the first byte of the new chroma word, the number of bytes in each second multi-byte sequence being pre-determined.

In some implementations, the method further comprises, before determining the first chroma word associated with the new audio track to be indexed, determining an audio fingerprint of the new audio track to be indexed, the chroma word being part of the audio fingerprint.

In some implementations, the audio fingerprint is any one of (i) a short audio fingerprint of a first portion of the new audio track, the first portion of the new audio track being of a first predetermined duration from a start of the new audio track, and (ii) a long audio fingerprint of a second portion of the new audio track, the second portion of the new audio track being of a second predetermined duration from the start of the new audio track.

In some implementations, the first predetermined duration is lesser one of: a predetermined duration within a time range from 9 to 27 second, and a new audio track duration.

In some implementations, the first predetermined duration is lesser one of: 21 second, and a new audio track duration.

In some implementations, the second predetermined duration is lesser one of: a predetermined duration within a time range from 96 to 141 second, and a new audio track duration.

In some implementations, the second predetermined duration is lesser one of: 120 seconds, and a respective audio track duration.

In some implementations, the chroma word describes a chunk of the audio track, duration of the chunk of the audio track being within time range from ½ second to 8 second.

In some implementations, the duration of the chunk of the audio track is 3 second.

In some implementations, each of the chroma words contains an indication of a track ID associated with a respective audio track.

In some implementations, each of the chroma words contains an indication of a track duration information associated with a respective audio track.

In some implementations, the track ID is described with one byte which follows any one of (i) the following byte, and (ii) the second multi-byte sequence.

In some implementations, the indication of a track duration is described with one byte which follows any one of (i) the following byte, and (ii) the second multi-byte sequence.

In some implementations, the short audio finger print is stored in an audio track inverted index, which audio track inverted index is executed as a pruning index, the pruning index being built for a plurality of short audio fingerprints.

In the context of the present specification, an "audio fingerprint" is a condensed digital summary, deterministically generated from an audio signal, that can be used to identify an audio sample or quickly locate similar items in an audio database.

In the context of the present specification, a "chroma word" is a component of an audio fingerprint, each chroma word being a sequence of bytes describing a chunk of the audio. As a non-limiting example, the chroma word can be a component of an audio fingerprint being generated using the "Chromaprint" technology.

In the context of the present specification, an "audio track" is an audio file, a video file comprising an audio track, any other recording of an audio signal being suitable for computer analysis, as well as not-recorded audio signals, for example, audio signal originating at a transducer such as a microphone.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 7:
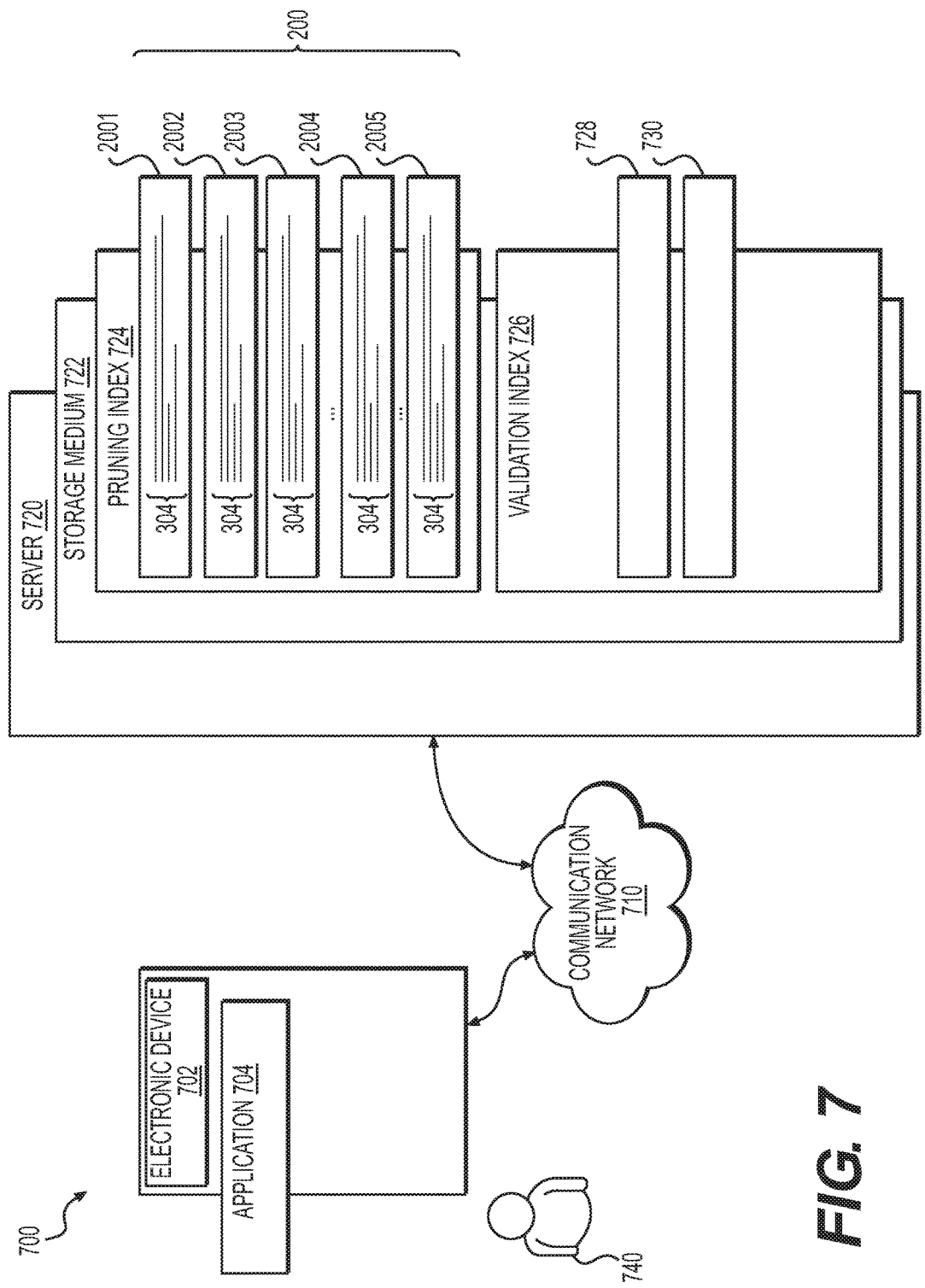
FIG. 7 is a schematic diagram depicting a system 700, the system 700 being implemented in accordance with non-limiting embodiments of the present technology.

In one aspect, some implementations of the present technology provide a computer-implemented method of matching incoming audio tracks with the audio tracks which are already indexed and/or stored into a database accessible by a server 720 (depicted in FIG. 7). Broadly speaking, the method comprises the steps of (i) fast audio track candidate selection and (ii) validating the candidates.

In another aspect, some implementations of the present technology provide a non-transient computer information storage medium storing an audio track inverted index. In some implementations, the audio track inverted index can be built as two distinct indexes: (i) a pruning index 724, the pruning index 724 being built for a plurality of short audio fingerprints, and (ii) a validation index 726, the validation index 726 being built for a plurality of long audio fingerprints.

In yet another aspect, some implementations of the present technology provide a method of maintaining the audio track inverted index, which audio track inverted index can be built as two distinct indexes: (i) a pruning index 724, the pruning index 724 being built for a plurality of short audio fingerprints, and (ii) a validation index 726, the validation index 726 being built for a plurality of long audio fingerprints.

System Overview

FIG. 7 is a schematic diagram depicting a system 700, the system 700 being implemented in accordance with non-limiting embodiments of the present technology Referring to FIG. 7, there is shown a schematic diagram of a system 700, the system 700 being suitable for implementing non-limiting embodiments of the present technology. It is to be expressly understood that the system 700 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 700 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 700 may provide in certain instances simple implementations of the present technology, and that where such is the case they have been presented in this manner as an aid to understanding. As persons skilled in the art would understand, various implementations of the present technology may be of a greater complexity.

The system 700 comprises an electronic device 702. The electronic device 702 is typically associated with a user 740 and, as such, can sometimes be referred to as a "client device". It should be noted that the fact that the electronic device 702 is associated with the user does not need to suggest or imply any mode of operation—such as a need to log in, a need to be registered or the like.

The implementation of the electronic device 702 is not particularly limited, but as an example, the electronic device 702 may be implemented as a personal computer (desktops, laptops, netbooks, etc.) or as a wireless communication device (a smartphone, a tablet and the like). The electronic device 702 comprises hardware and/or software and/or firmware (or a combination thereof), as is known in the art, to execute an application 704 which can be web browser or any other application permitting uploading audio tracks on the server 720 or on storage mediums accessible by the server 720.

According to implementations of the present technology, the application 704 can support transmission of data to the server 720 or to the storage mediums accessible by the server 720. Naturally, the application 740 may also support downloading of data from the server 720 or any other source.

The application 704 can be any conventional web browser or any other application permitting uploading content. As non-limiting examples, the application 704 can be implemented as Yandex™ browser application. It should be expressly understood that any other commercially available or proprietary application can be used for implementing non-limiting embodiments of the present technology.

The electronic device 702 is coupled to a communications network 710 via a communication link (not separately numbered). In some non-limiting embodiments of the present technology, the communications network 710 can be implemented as the Internet. In other embodiments of the present technology, the communications network 710 can be implemented differently, such as any wide-area communications network, local-area communications network, a private communications network and the like.

How the communication link is implemented is not particularly limited and will depend on how the electronic device 702 is implemented. Merely as an example and not as a limitation, in those embodiments of the present technology where the electronic device 702 is implemented as a wireless communication device (such as a smartphone), the communication link can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 702, the communication link and the communications network 710 are provided for illustration purposes only. As such, those skilled in the art will easily appreciate other specific implementation details for the electronic device 702, the communication link and the communications network 710. As such, by no means, examples provided herein above are meant to limit the scope of the present technology.

The server 720 can be implemented as a conventional computer server. In an example of an embodiment of the present technology, the server 720 can be implemented as a Dell™ PowerEdge™ Server running the Microsoft™ Windows Server™ operating system. Needless to say, the server 720 can be implemented in any other suitable hardware and/or software and/or firmware or a combination thereof. Generally speaking, the purpose of the server 720 is to enable the user 740 to upload audio tracks; to perform matching of received audio tracks and stored audio tracks.

The server 720 comprises a computer usable information storage medium 722, also referred to as the storage medium 722. Storage medium 722 can comprise any type of media, including but not limited to RAM, ROM, disks (CD-ROMs, DVDs, floppy disks, hard drivers, etc.), solid state-drives, tape drives, etc. Generally speaking, the purpose of the storage medium 722 is to store computer readable commands as well as any other data, such as a pruning index 724 and a validation index 726, etc. In alternative embodiments, the pruning index 724 and the validation index 726 can be implemented as a single audio track inverted index 724 (not depicted). In alternative embodiments, the pruning index 724 and the validation index 726 can be implemented as three and more indexes.

The pruning index 724 comprises plurality of sets 200 of posting list, the plurality of sets 200 having sets of posting list organized in accordance with a combination of bytes 202, all being implemented in accordance with non-limiting embodiments of the present technology.

The pruning index 724 comprises plurality of sets 200 of posting list 304 generated for short audio fingerprints, as will be described in greater detail herein below.

The validation index 726 comprises key file 728 and fingerprint file 730. Fingerprint file 730 comprises a sequence of long fingerprints. In this implementation of the present technology, fingerprints are placed in the fingerprint file 730 one after another, without separators. In this implementation of the present technology, each long fingerprint in the fingerprint file 728 begins with two first bytes describing length of the corresponding fingerprint. Key file 728 comprises track ID's (not depicted on FIG. 7) associated with a respective audio track, track ID's having references to beginnings of long fingerprints in the fingerprint file 730, as will be described in greater detail herein below.

Matching: Basic Notions

To facilitate matching, short and long audio fingerprints of all stored audio tracks are generated. The length of all short audio fingerprints and all long audio fingerprints from the beginning of each respective audio file can be pre-determined and be consistent for all respective short fingerprints and long fingerprints.

For example, all short audio fingerprints can be created for up to 20 first seconds of each stored audio track, and all long audio fingerprints can be created for up to 120 first seconds of each stored audio track. However, if a length of a particular audio track is less than pre-determined value for respective short or long audio fingerprint, the respective short or long audio fingerprint is created for the whole audio track.

As such, within the latter implementations, the length of the respective short or long fingerprint can be shorter than the respective predetermined value. Furthermore, if the length of the audio track is less than the pre-determined value for the short audio fingerprint, then the length of the short audio fingerprint and the long audio fingerprint can be identical.

Each audio fingerprint comprises chroma words which chroma words describe small equal chunks of the associated audio track. Chroma words can describe overlapping chunks of the audio track. Each chroma word can be represented as a sequence of bytes. Structure and features of audio fingerprints and chroma words will be described in more details below, predominantly when describing FIG. 1.

When the server 720 receives the incoming audio track, a short audio fingerprint of the up to 20 first seconds of the incoming audio track is created.

Matching procedure comprises two stages: a fast candidate selection stage, and a candidate validation stage.

As has been alluded to above, the server 720 can maintain two indexes: a pruning index 724 containing the short audio fingerprints, and a validation index 726 containing the long audio fingerprints. Sequences of bytes in chroma words can be used as keys to find matching audio tracks. How indexes are built and maintained will be described below, predominantly when describing FIGS. 2 to 4.

During the first stage of matching procedure, the fast candidate selection, the server 720 finds candidate audio tracks using a first short audio fingerprint (that is a short audio fingerprint of the incoming audio track) within the pruning index 724. Candidate audio track can be an audio track which comprises at least one chroma word fully matching a chroma word identified in the incoming audio track.

During the second stage of matching procedure, the stage of validation, the server 720 generates a first long audio fingerprint. The first long audio fingerprint can describe a portion of the audio track of up to 120 first seconds of the incoming audio track.

Thereafter the server 720 performs validation of candidate audio tracks by bit-by-bit comparison of the long audio fingerprint of the incoming audio track with long audio fingerprints stored in a data base and accessible by the server 720 using a validation index 726. At this stage, the server 720 can take into account different quality of audio tracks being matched, as well as time shift between audio tracks being matched.

At this stage, the server 720 excludes from the list of candidates those indexed audio tracks which length is deviates from the length of the incoming audio track by a pre-determined time period, such as 10 seconds, 30 seconds, a minute and the like. To establish that two audio tracks match, their audio fingerprints have to be matched to a pre-determined level. For example, in some embodiments, the 100 percent match of bits in long audio fingerprints of the incoming audio track and the candidate audio track is not expected. As such, the match can be found, where not all of the bytes of the long fingerprints match, but rather 90 percent, 80 percent, 70 percent or the like of the bytes do match.

Audio Fingerprints and Chroma Words

It should be noted that specific implementation of the audio fingerprint is not limited and, as such, several prior art approaches to creating the audio fingerprint can be used. An example prior art technology that can be used for generating the audio fingerprint is disclosed in the U.S. Pat. No. 7,013,301 B2 "Audio fingerprinting system and method", content of which is incorporated by reference in its entirety in all those jurisdictions where such incorporation is permitted by law.

Another approach to generating the audio fingerprint is described in the publication "How does Chromaprint work?" by Lukáš Lalinský published on the web page https://oxygene.sk/2011/01/how-does-chromaprint-work/, content of which is incorporated by reference in its entirety in all those jurisdictions where such incorporation is permitted by law. "Chromaprint" is a client-side library that implements a custom algorithm for extracting audio fingerprints from any audio source. Hyperlinks to the source codes are published on https://acoustid.org/chrormaprint. The source code is available for licensing under the LGPL2.1+license.

"Chromaprint" technology provides for representation of an audio track as a spectrogram which shows how the intensity on specific frequencies changes over time. To create the spectrogram, the audio track is split into a plurality of overlapping frames and then the Fourier transform function is applied to the plurality of overlapping frames.

In the case of Chromaprint, the input audio can be converted to the sampling rate 11025 Hz and the frame size is 4096 (0.371 s) with ⅔ overlap. Chromaprint processes the information further by transforming frequencies into musical notes, so the result has 12 bins, one for each contains a respective note. As a result, representation of the audio that is robust to changes is generated.

Thereafter, on each of them a pre-defined set of 16 filters is applied, which filters capture intensity differences across musical notes and time. As a result, a "chroma word" is created. The "chroma word" is a component of an audio fingerprint, each chroma word being represented in a sequence of bytes, describing a chunk of the audio.

As a person skilled in the art would understand, other methods of generating audio fingerprints can be used. In addition, described methods can be used with modifications.

However, it should be understood that in some embodiments, once a specific method for generating the audio fingerprints is selected, it is applied to the generation of both the short and the long fingerprints. In other embodiments, a different technology can be applied to generation of the short and the long fingerprints.

Figure 1:
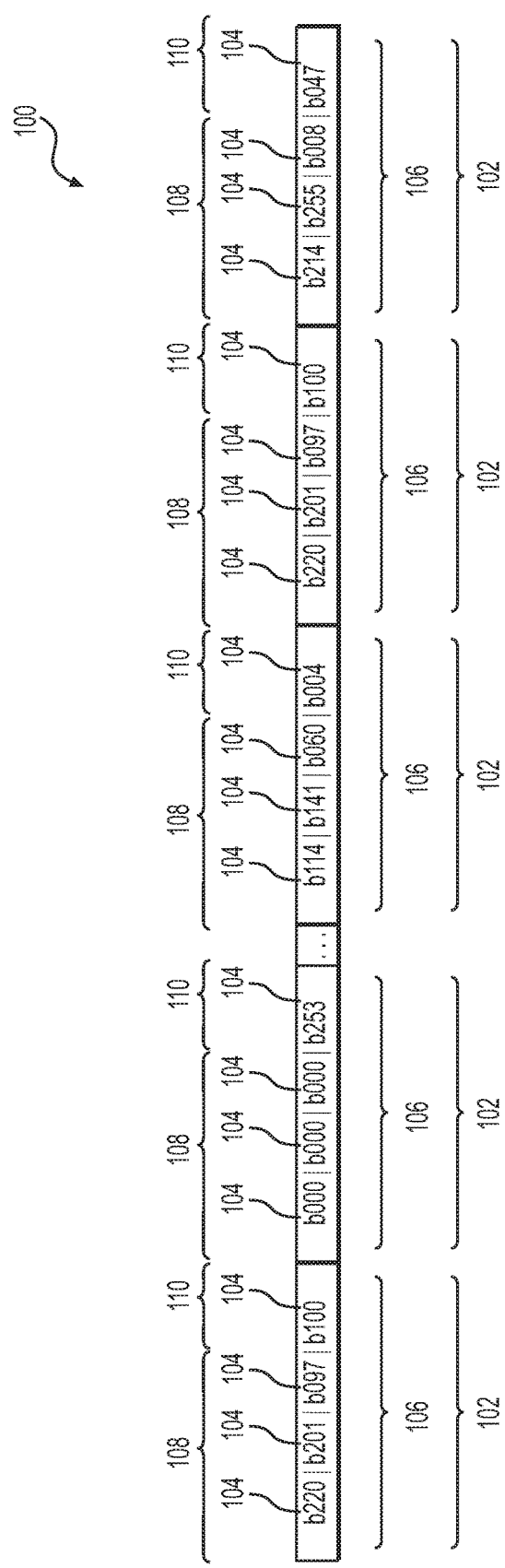
FIG. 1 is a schematic diagram depicting an audio fingerprint 100, the audio fingerprint 100 being an implementation of an audio fingerprint, the audio fingerprint 100 being implemented in accordance with non-limiting embodiments of the present technology.

With reference to FIG. 1, there is depicted an audio fingerprint 100. For example, the audio fingerprint is an audio fingerprint of an incoming audio track (the incoming audio track being an audio track received by the server 720 from the user 740 of the electronic device 702 (all depicted in FIG. 7).

At this point of time, it is not yet known if the very same audio track is indexed and/or stored in a database (not depicted) accessible by the server 720. The server 720 generates an audio fingerprint of the incoming audio track. The server 720 then compares the so-generated audio fingerprint with plurality of second audio fingerprints, the second audio fingerprints having already been indexed and stored into the databases and/or in indexes (for example, in validation index 726), accessible by the server 720. If the audio fingerprint matches one of the plurality of second audio fingerprints, a potential match is determined.

More specifically, a second audio fingerprint 100 is an audio fingerprint of an audio track which is already indexed and/or stored into a database, which database is accessible by the server 720. There can be more than one second fingerprint 100 for the very same audio track, because the second fingerprint for an audio file can be created, for the first predetermined duration (the second short audio fingerprint) and for the second predetermined duration (the second long audio fingerprint). For example, the second short fingerprint 100 and the second long fingerprint 100 can be created for the very same audio track, but for different duration, starting from the beginning of the audio track (for example, for the first 21 second starting from the beginning of the audio track, and for the first 120 second starting from the beginning of the audio track). The second audio fingerprint is stored in the database (not depicted) which is accessible by the server 720. The second audio fingerprint 100 is a representation of one of the plurality of second audio fingerprints stored in the database.

In some embodiments, each of the second audio fingerprints contains an indication of a track ID 402 associated with a respective audio track to which each of the second audio fingerprints belongs, it is possible to detect that the incoming audio track has a matched stored audio track. This knowledge can be used in various ways. For example, the knowledge of the matched stored audio track can be used to provide a better copy of the musical track to the user. Alternatively or additionally, the knowledge can be used to identify the copyright owner and/or obtain authorization to use the audio track and/or make a royalty payment to the copyright owner. Alternatively or additionally, the knowledge can be used for finding and deleting duplicates.

With continued reference to FIG. 1, it shall be assumed that the audio fingerprint 100 is associated with the first incoming audio track and that the length of the first incoming track, in this example, is 5 minutes 41 second.

As it is depicted on FIG. 1, the audio fingerprint 100 comprises chroma words 102, the chroma words 102 generated during audio fingerprinting of the first incoming audio track. The audio fingerprint 100 can comprise, besides chroma words, other components, for example, an indication of duration of the first incoming audio track and the like.

The size of each chroma word 102 within the audio fingerprint 100 is the same: each chroma word 102 has four bytes 104. Since one byte is equal to eight bits and has $2^8$ or 256 possible values, counting from 0 to 255, bytes in the example depicted on FIG. 1 are presented as values within the range starting from b000 to b255.

The bytes 104 of each chroma word 102 of any audio fingerprint can be grouped into at least two groups. The first two groups make a beginning portion 106 of a chroma word, as it is shown on FIG. 1. The number of bytes in each of first two groups can be pre-determined. As an example, the number of bytes within the first two groups can be at least one.

As a person skilled in the art would understand, in different implementations the number of bytes in each of the first two groups group can be pre-determined in a different way. For example, in the beginning portion 106 of a chroma word, the beginning portion 106 being four bytes in length, the following combinations are possible:

1 byte and 3 bytes;
2 bytes and 2 bytes;
3 bytes and 1 byte.

Therefore, broadly speaking, in any four-byte chroma word, the following combinations of groups are foreseeable:
 a first byte (not depicted) and a second multi-byte sequence (not depicted);
 the first multi-byte sequence being a two-byte sequence, and the second multi-byte sequence also being a two-byte sequence; and
 the first multi-byte sequence 108 being a three-byte sequence, and a following byte 110.

A specific example of the above is depicted in FIG. 1, the bytes 104 within each chroma word 102 of the audio fingerprint 100 are grouped into two groups: (i) a first multi-byte sequence 108, the first multi-byte sequence 108 being the sequence of bytes 104, the sequence of bytes 104 located in the beginning portion of the respective chroma word, and (ii) a following byte 110. In other words, the bytes in each chroma word 102 are separated into two groups, wherein the size of the first group is three bytes, and the size of the second group is one byte.

Generally speaking, the beginning portion 106 of a chroma word is a portion of the chroma word which consists of combination of the first multi-byte sequence (or the first byte, as the case may be) and the second multi-byte sequence (or the following byte, as the case may be).

In alternative implementations, bytes within chroma words can be grouped into more than two groups.

However, the beginning portion 106 of a chroma word may not necessarily coincide the chroma word itself.

The server 720 can generate the audio fingerprint 100 for the whole incoming audio track as well as for a portion of the incoming audio track. Within embodiments of the present technology, the server 720 can generate more than one audio fingerprint for the incoming audio track. For example, in some embodiments, the server 720 generates a first short audio fingerprint and a first long audio fingerprint.

A short audio fingerprint is an audio fingerprint of a first portion of an audio track, the first portion of the audio track being of a first predetermined duration from a start of the audio track. In some embodiments, the first predetermined duration from the start of the audio track is lesser one of: a predetermined duration within a time range from 9 to 27 second or a audio track duration.

In the illustrated implementation of the embodiments, let's assume that the first predetermined duration from the start of the audio track is predetermined to be lesser one of 21 second and an audio track duration. Recalling that the duration of the incoming audio track is 5 minutes 41 second, which is more than 21 second, the server 720 generates the first short audio fingerprint for the first 21 second of the incoming audio track.

A long audio fingerprint is an audio fingerprint of a second portion of an audio track, the second portion of the audio track being of a second predetermined duration from the start of the audio track. In some embodiments, the second predetermined duration from the start of the audio track is lesser one of: a predetermined duration within a time range from 99 to 141 second or a audio track duration. In the illustrated embodiment, the first predetermined duration from the start of the audio track is predetermined to be lesser one of 120 second and an audio track duration. Recalling that the duration of the incoming audio track is 5 minutes 41 second, which is more than 120 second, the server 720 generates the first long audio fingerprint for the first 120 second of the incoming audio track.

The audio fingerprint 100 depicted in FIG. 1 can be any one of the first short audio fingerprint, the first long audio fingerprint, the second short audio fingerprint and the second long audio fingerprint. The structure of both these audio fingerprints of the incoming audio track can be the same, except that the first long audio fingerprint comprises more chroma words. As both the first long and the first short audio fingerprints of the same audio track are generated using the same technology, with regard respectively longer and shorter portions of the same audio track from its beginning, the first short audio fingerprint is identical to a beginning of the first long audio fingerprint.

As a person skilled in the art would understand, in different implementations the number of bytes in each of the first two groups group can be pre-determined in a different way. For example, in the beginning portion 106 of a chroma word, the beginning portion 106 being four bytes in length, the following combinations are possible:
1 byte and 3 bytes;
2 bytes and 2 bytes;
3 bytes and 1 byte.

Therefore, broadly speaking, in any four-byte chroma word, the following combinations of groups are foreseeable:
- a first byte (not depicted) and a second multi-byte sequence (not depicted);
- the first multi-byte sequence being a two-byte sequence, and the second multi-byte sequence also being a two-byte sequence; and
- the first multi-byte sequence 108 being a three-byte sequence, and a following byte 110.

Posting Lists and Sets of Posting Lists

Figure 2:
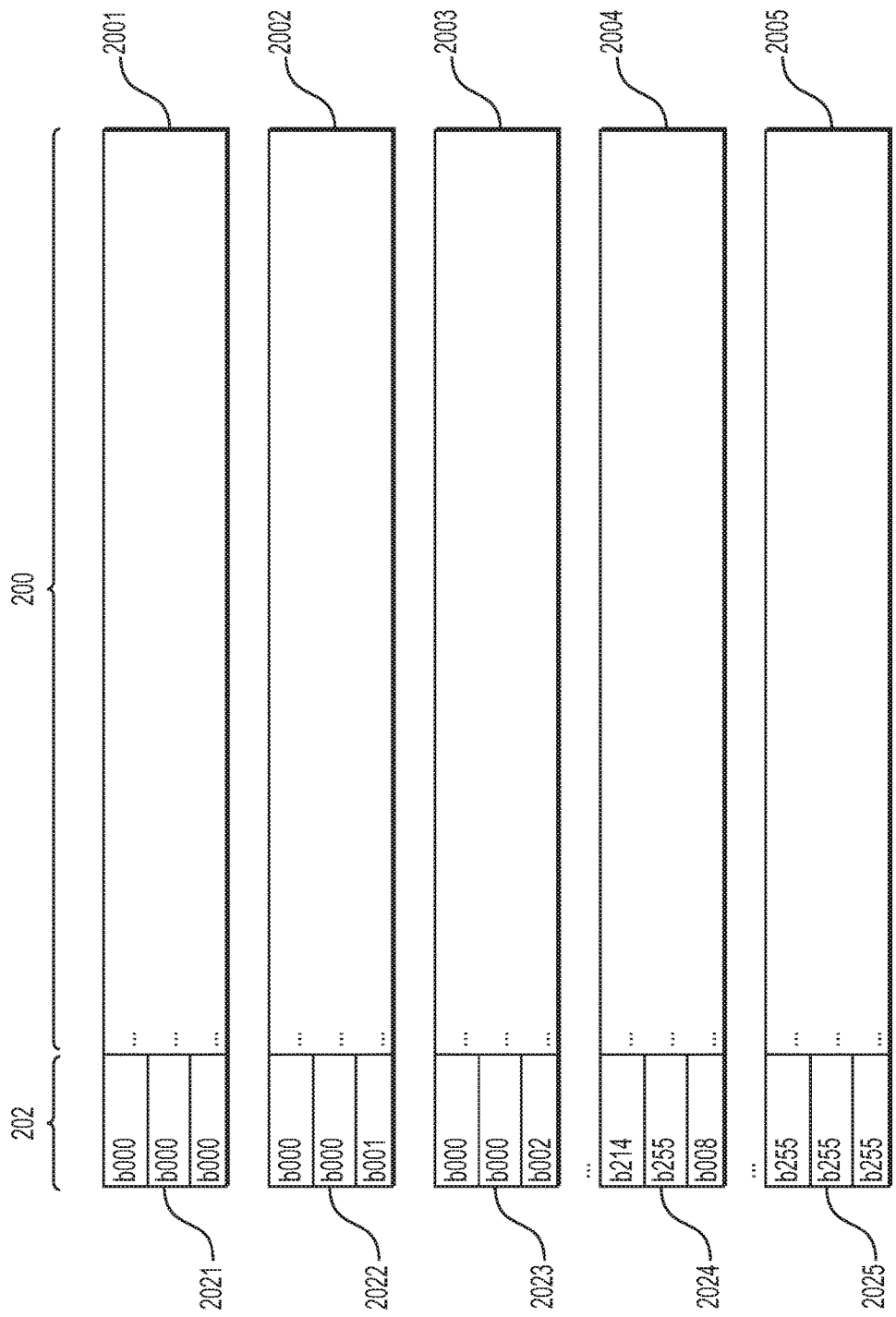
FIG. 2 is a schematic diagram depicting a plurality of sets 200 of posting list, the plurality of sets 200 having sets of posting list organized in accordance with a combination of bytes 202, all being implemented in accordance with non-limiting embodiments of the present technology.

FIG. 2 is a schematic diagram depicting a plurality of sets 200 of posting lists. Each set of posting lists is depicted as a large rectangular and is numbered separately as 2001, 2002, 2003, ... 2004 ... and so on.

Posting list is an index data structure storing a mapping of content, such as audio tracks, to its locations in a database file, or in a document or a set of documents. The purpose of the posting list is to allow fast audio track searches, at a cost of increased processing when an audio track is added to the database.

Figure 4:
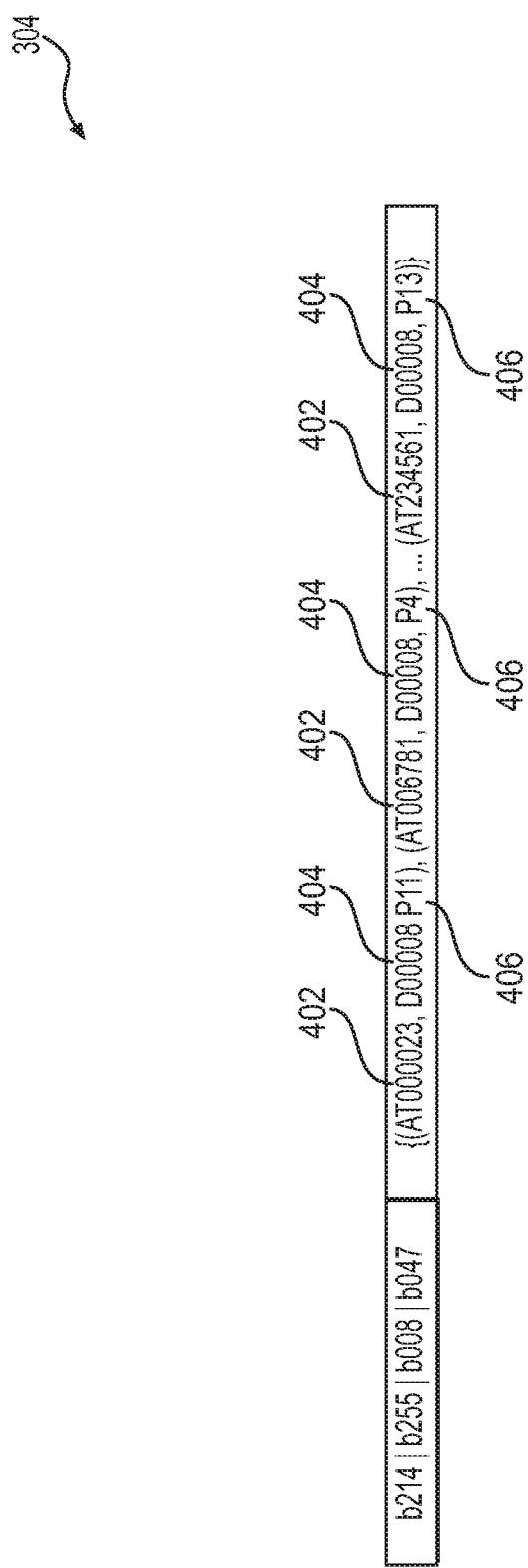
FIG. 4 is a schematic diagram depicting a posting list 304, the posting list 304 being implemented in accordance with non-limiting embodiments of the present technology.

A posting list 304 is depicted in FIG. 4. The posting list 304 is one of posting lists grouped into the set 200 of posting lists. The posting list 304 for each chroma word 102 can comprise track ID 402 associated with an audio track which the respective chroma word 102 describes. Track ID 402 can be a multi-byte sequence. In this implementation of the present technology, the track ID is a sequence of four bytes. The posting list 304 for each chroma word 102 can also comprise indication 404 of track duration information associated with an audio track where the respective chroma word 102 originates from. Further, the posting list 304 for each chroma word 102 can also comprise an indication 406 of a position of the chroma word 102 within the audio track from which the respective chroma word 102 describes.

There is only one particular posting list 304 for all chroma words 102 which have the same beginning portion 106. For example, if there are several chroma words 102, beginning portion 106 of each of these chroma words 102 being b214|b255|b008|b047, there will be only one posting list for all these chroma words 102 having the beginning portion 106 b214|b255|b008|b047.

Within a given set 200 of posting lists 304 of the plurality of postings lists 304, each posting list 304 contains chroma words 102 having the same first multi-byte sequence 108 of the chroma word 102. It is to be recalled that the first multi-byte sequence 108 of chroma word 108 is less than the beginning portion 106 of the chroma word 108. In addition to the first multi-byte sequence 108, the beginning 106 of the chroma word 102 further comprises the following byte 110. In other words, each set 200 of posting lists 304 comprises only these posting lists 304 which make references for the chroma words 102, which chroma words 102 having the very same first multi-byte sequence 108, for example b214|b255|b008 (or the very same the first byte, as the case may be in some implementations). It means that each set 200 of posting lists 304 comprises posting lists 304, which posting lists 300 can be generated for different chroma words, those chroma words having the same first multi-byte sequence 108, but distinctive following bytes 110; for example, one set 200 of posting lists 304 can be generated for following chroma words: b214|b255|b008|b008, b214|b255|b008|b012, b214|b255|b008|b047, b214|b255|b008|b077, b214|b255|b008|b201.

FIG. 2 illustrates sets 200 of posting lists 304, which posting lists 304 are generated for chroma words 102. Since each chroma word 102 has the first multi-byte sequence 108 which is a sequence of three bytes, so each posting list is grouped into the set 200 of posting lists 304, which set 200 begins with a sequence of three bytes.

Since in this example each chroma word has the first multi-byte sequence being a sequence of three bytes, each of sets 200 of posting lists 304 is also defined by any possible combination of three bytes, starting from a first set 2001, which is defined by combination of bytes 2021 (b000|b000|b000), and ending with a last set 2005 which is defined by combination of bytes 2025 (b255|b255|b255).

All these combinations of bytes 2021 to 2025 can be used as a respective index key from a plurality of index keys 202, as will be explained later. Since, as it was mentioned above, one byte is equal to eight bits and has $2^8$ or 256 possible values, counting from 0 to 255, bytes in the example depicted on FIG. 2 are presented as values within the range starting from b000 to b255. Therefore, there can be 16,777,216 combinations of three bytes ($256^3$). All these combinations of bytes will be used as index keys 202, as will be explained later. Since sets 200 of posting lists are defined by number of bytes being equal to the number of bytes in the first multi-byte sequence 108, there will be 16,777,216 sets 200 of posting lists 304.

The number of sets 200 of posting lists 304 can be less and can be more than 16,777,216, depending on the length of the first multi-byte sequence. For example, wherein the first multi-byte sequence 108 consists of one sole byte (that is, of the "first byte"), there will be 256 sets 200 of posting lists 304.

It is possible that there is no posting lists for chroma words starting from certain first byte or from certain first multi-byte sequence. Let's imagine, that in the whole data base of audio tracks, there are no audio fingerprints which would comprise chroma words starting with the first multi-byte sequence b010|b127|b206. Within this scenario, the set 200, associated with the multi-byte sequence b010|b127|b206 will be empty, comprising in fact no posting lists. It is possible that a posting list will be added to existing set 200, the set 200 determined by multi-byte sequence b010|b127|b206, when a new audio track will be audio fingerprinted and when at least one new chroma word 102 will begin with the multi-byte sequence b010|b127|b206.

Within a given set of posting lists, one of posting lists 304 is different from another posting list 304 by the associated chroma words 102 having a different following byte (or by the second multi-byte sequence, as the case may be in some embodiments). The different following byte (or the second multi-byte sequence, as the case may be in some embodiments) is unique for the given set of posting lists.

Let's take as an example the set 2004 depicted in the FIG. 2. The set 2004 comprises all posting lists 304 for indexed chroma words 102, which chroma words 102 have the same first multi-byte sequence b214|b255|b008. All chroma words 102 having the same first multi-byte sequence b214|b255|b008 differs one from another by the following byte 110 (or by the second multi-byte sequence, as the case may be in some embodiments).

Since a particular posting list has references for all entries of a particular chroma word, such a posting list is unique within a given set of posting lists. Therefore the following byte 110 (or the second multi-byte sequence, as the case may be in some embodiments) is what distinguishes one posting list 304 from another posting list 304 within the same set 200 of posting lists.

For example, the set 2004 of posting lists beginning with the sequence of bytes b214|b255|b008, will comprise plurality of posting lists beginning with the combination of bytes b214|b255|b008, wherein each posting list will have different next byte 302 corresponding to the following byte 110. Mentioned combination of bytes 2024 (b214|b255|b008) can be used as an index key 2024 (see FIG. 3). The next byte 302 is identical to the following byte 110 of a respective chroma word 102, and is used as sorting key 302 in the audio track inverted index. In some embodiments, the next byte 302 is a multi-byte sequence which is identical to the second multi-byte sequence, and is also used as a sorting key 302.

A Non-Transient Computer Information Storage Medium Storing an Audio Track Inverted Index In one aspect, some implementations of the present technology provide the non-transient computer information storage medium 722, a schematic representation of which is depicted in FIG. 7. The non-transient computer information storage medium 722 stores an audio track inverted index.

The audio track inverted index can be stored in two separate indexes, the pruning index 724 and the validation index 726. The same technology can be used for creating and maintaining the pruning index 724 and the validation index 726. Both the pruning index 724 and the validation index 726 will be further collectively referred to as the audio track inverted index 724 (not depicted).

When reference is made to the audio track inverted index 724, this reference is applicable to both, the pruning index 724 and the validation index 726. As a person skilled in the art would appreciate, the representation of the pruning index 724 and the validation index 726 is simplified; both indexes can comprise other components which are not depicted in FIG. 7, for example index keys 202 and sorting keys 302.

Figure 3:
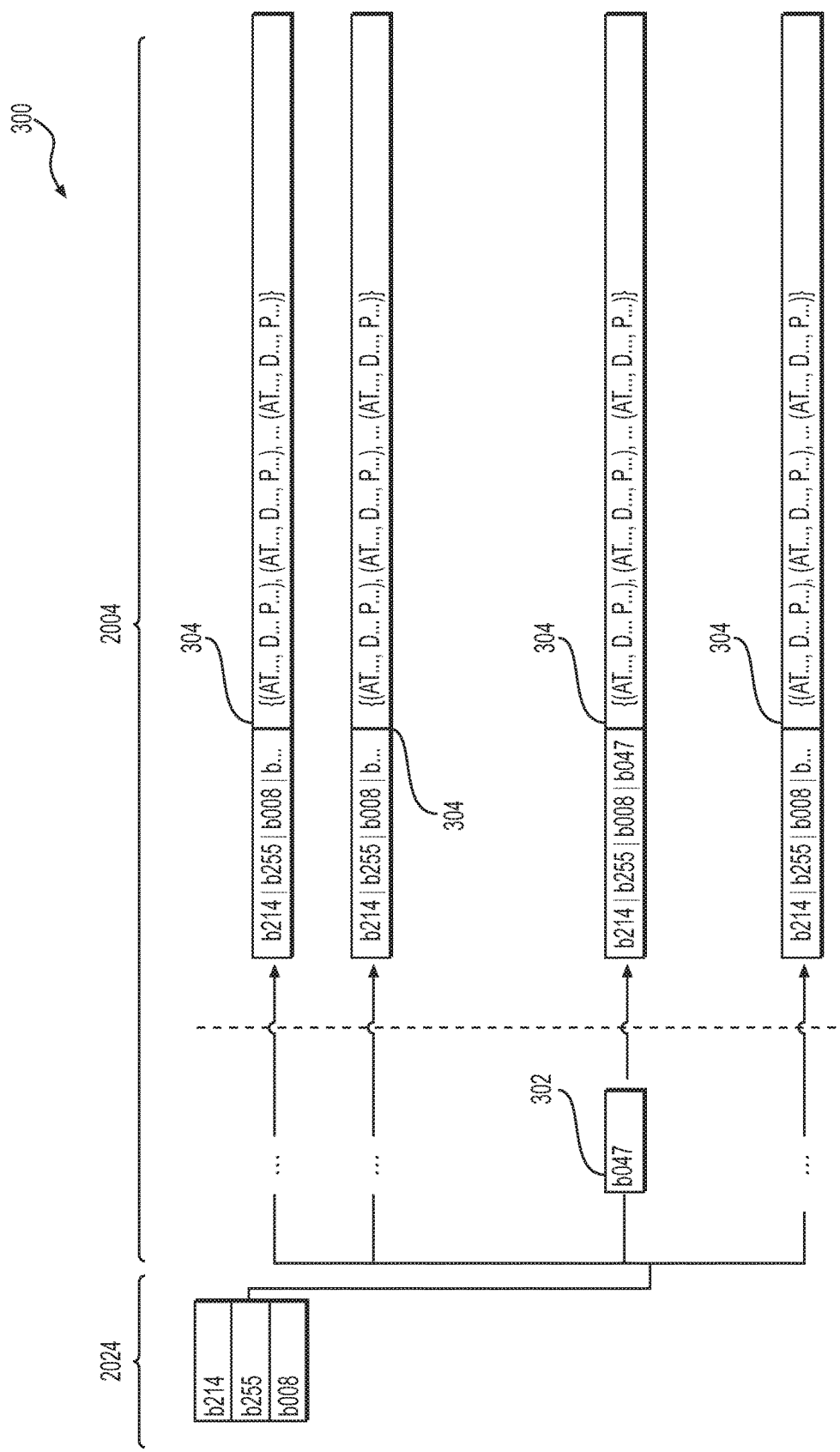
FIG. 3 is a schematic diagram depicting a portion 300 of a pruning index 724, the portion 300 of the pruning index 724 for a particular set 2004 of posting lists 304, the portion 300 of the pruning index 724 being implemented in accordance with non-limiting embodiments of the present technology.

FIG. 3 represents a portion 300 of the pruning index 724, the portion 300 of the pruning index 724 for a particular set 2004 of posting lists. The whole audio track inverted index 724 (not depicted) consists of plurality of such portions 300, representing all possible sets 200 of posting lists.

The audio track inverted index 724 comprises a plurality 200 of sets of posting lists 304, each posting list 304 within the plurality of sets 200 of posting lists 304 being a posting list 304 of chroma words 102, each chroma word 102 being a component of the audio fingerprint 101.

In some implementations, each of the sets 200 of posting lists 304 is associated with an index key 202. As it is depicted on FIG. 2, all the sets 200 of posting lists 304 are unique: the set 2001, the set 2002, the set 2003 and so on, each of plurality of sets 200 being determined by the unique combination of bytes 202. Since one particular index key 202 of the plurality of index keys is associated with one particular set from the plurality of sets 200, each index key 202 is unique so that a particular index key 202 corresponds to a particular set 200 of posting lists. For example, the particular set 2004 of posting lists, being unique, corresponds to the combination of bytes 2024 (b214|b255|b008) which is used as the index key 2024, the index key 2024 also being unique.

In some implementations, the index key 202 is for quick location of the given set 200 of posting lists 304 within the audio track inverted index 724. Using the index key 202 permits determining that targeted set 200 of posting lists, which comprises a particular posting list for a particular chroma word. Therefore, narrowing the search permits the quick location of the given set 200 of posting lists 304 within the index.

In some implementations, each of the posting lists 304 within the given set 200 of posting lists 304 is associated with a sorting key 302, the sorting key 302 being unique for the given set of posting lists.

In some implementations, the sorting key 302 is for quick location of the posting list within the given set of posting lists, as the sorting key 302 permits distinguishing one posting list 304 from all other posting lists 304 within the given set 200 of posting lists using unique sorting key 302.

In some implementations, the index key 202 comprises the first multi-byte sequence 108. Therefore, the index key 202 will be identical to the first multi-byte sequence 108 which also defines sets 200 of posting lists 304.

A Method of Creating and Maintaining an Audio Track Inverted Index

In another aspect, some implementations of the present technology provide a method of creating and maintaining a pruning index 724.

The method comprises receiving, by a server 720, an audio track to be indexed. Receiving can be effected, for example, from a copyright holder. The audio track can then be uploaded in a database (not depicted) stored on or accessible by the server 720.

The method comprises also determining a first chroma word 102 associated with the new audio track to be indexed, the first chroma word 102 being split into a plurality of bytes 104, the first chroma words 102 comprising a beginning portion 106 of the chroma word 102, the beginning portion 106 of the chroma word 102 being a sub-plurality of bytes having a first byte and a following byte 110, the following byte 110 located immediately after said first byte. In this embodiment, therefore, the beginning portion 106 of the chroma word 102 comprises two bytes.

Further, the method comprises, based on the first byte, determining a specific set 200 of postings lists 304 within a plurality of sets 200 of posting lists 304, the specific one within the plurality of sets of posting lists reserved for posting lists having references for chroma words sharing same the first byte in the beginning portion 106. The number of sets 200 can be equal to 256, because sets of posting lists can be created corresponding to any possible first byte. Since, as it was mentioned above, one byte is equal to eight bits, that is $2^8$, 256 values are possible.

Further, the method comprises, responsive to the following byte 110 of the first chroma word 102 matching any following byte 110 of any chroma words 102 intended to be stored in a given posting list 304 within the specific set 200 of posting lists 304, storing an indication of the new first chroma word in the given posting list 304. Alternatively, responsive to the following byte 110 of the first chroma word 102 not matching any following byte 110 of any chroma words 102 stored in the posting lists 304, creating a new posting list 304 within the specific set 200 of posting lists 304 storing an indication of the new first chroma word 102.

In some implementations, the method further comprises, before determining the first chroma word 102 associated with the new audio track to be indexed, determining an audio fingerprint 100 of the new audio track to be indexed.

In other words, the server 720 can generate a audio fingerprint 100 for the incoming audio track; then, it determines at least one chroma word 104 to be indexed, the chroma word 104 to be indexed comprising within the audio fingerprint 100. The chroma word 102 comprises the beginning portion 106 of the chroma word 102, which beginning portion 106 comprises the first byte and the following byte 110. Using the first byte as the index key 202, the server 720 determines the corresponding set 200 of posting lists 304, that set 200 being determined by the same byte as the first byte of the respective chroma word. Then, using the following byte 110 as the sorting key 302, the server 720 searches for the posting list 302 for all the chroma words having the same combination of the first byte and the following byte 110 in their beginning portion 106. That is, the particular posting list 304 shall be determined by the same two bytes as comprising in the beginning portion 106 of the chroma word 102 to be indexed.

It was mentioned above, the set 200 of posting lists 304 can be empty if there were no chroma words 102 indexed, which chroma words 102 would have a particular first byte (or the first multi-byte sequence, as it can be in alternative embodiments). In this case, the search using the sorting key 302 will demonstrate absence of the relevant posting key. If so, the new posting list will be created for that particular chroma word.

In some implementations, the first byte is a first multi-byte sequence 108, the first multi-byte sequence 108 being the sequence of bytes in the beginning of the beginning portion 106 of each new chroma word 102, the number of bytes 104 in each first multi-byte sequence 108 being the same.

In some implementations, the following byte 110 is a second multi-byte sequence, the second multi-byte sequence being the sequence of bytes following any one of the first multi-byte sequence 108 and the first byte of each new chroma word 102, the number of bytes 104 in each second multi-byte sequence being the same.

In some implementations, the audio fingerprint 100 is any one of a short audio fingerprint and a long audio fingerprint.

In some implementations, the short audio fingerprints are stored in a pruning index 724, the pruning index 724 being built for a plurality of short audio fingerprints. Pruning index 724 is used for fast selection of candidate audio tracks.

In some implementations, the long audio fingerprint is stored in a validation index 726, the validation index 726 being built for a plurality of long audio fingerprints. The validation index 726 is used for validation of audio tracks again the incoming audio track.

The validation index 726 can comprise key file 728 and fingerprint file 730. Fingerprint file 730 comprises a sequence of long fingerprints. In this implementation of the present technology, fingerprints are placed in the fingerprint file 730 one after another, without separators. In this implementation of the present technology, each long fingerprint in the fingerprint file 728 begins with two first bytes describing length of the corresponding fingerprint. Key file 728 comprises track ID's (not depicted on FIG. 7) associated with a respective audio track, track ID's having references to beginnings of long fingerprints in the fingerprint file 730.

A Computer-Implemented Method of Matching of Audio Tracks

In yet another aspect, some implementations of the present technology provide a computer-implemented method of matching of a first incoming audio track with an indexed audio track. The method is executable at the server 720.

Generally speaking, the method comprises two major stages: (1) selecting the indexed audio track as a candidate audio track from a plurality of indexed audio tracks, and (2) validating the candidate audio track against the first audio track.

Figure 5:
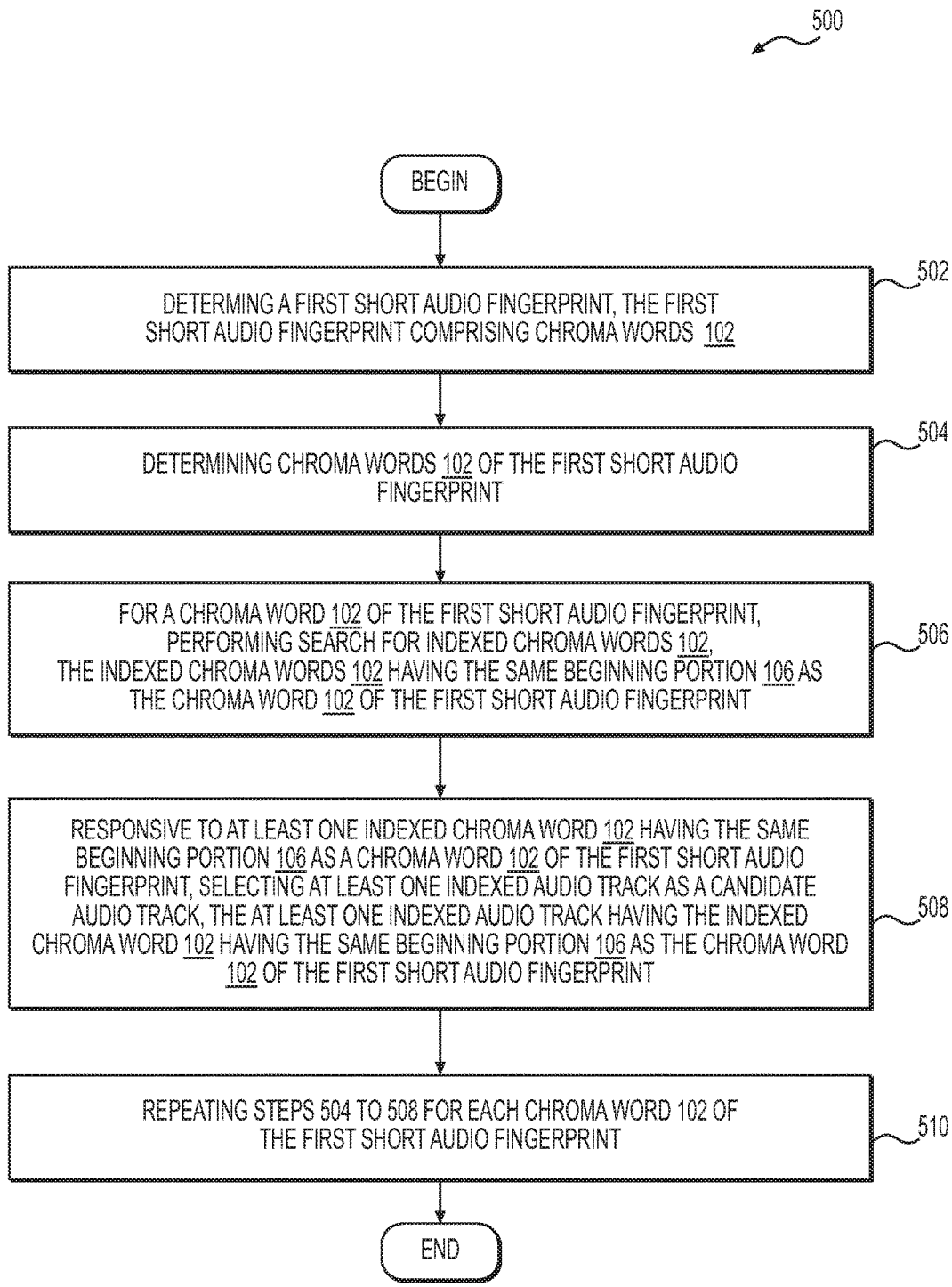
FIG. 5 is a block diagram depicting a method 500, the method 500 of selecting the indexed audio track as a candidate audio track from a plurality of indexed audio tracks, the method 500 implemented according with non-limiting embodiments of the present technology.

FIG. 5 is a block diagram depicting a method 500, the method 500 of selecting the indexed audio track as a candidate audio track from a plurality of indexed audio tracks, the method 500 implemented according with non-limiting embodiments of the present technology.

The method 500 begins at step 502.

At step 502, the server 720 determines a first short audio fingerprint, the first short audio fingerprint being an audio fingerprint of a first portion of the first incoming audio track, the first short audio fingerprint comprising a first chroma word 102, the first portion of the first audio track being of a first predetermined duration from a start of the first incoming audio track.

At step 504, the server 720 determines chroma words 102 of the first short audio fingerprint. Determining chroma words 102 is a part of the process of audio fingerprinting, as it was described above.

At step 506, the server 720 performs search for indexed chroma words 102, the indexed chroma words 102 having the same beginning portion 106 as the word 102 of the first short audio fingerprint.

As a non-limiting example, the search can be performed using a pruning index 724. Pruning index 724 is used for fast selection of candidate audio tracks. In some implementations, the short audio fingerprints are stored in a pruning index 724, the pruning index 724 being built for a plurality of short audio fingerprints.

The search can be performed as follows. First, the server 720 retrieves the first multi-byte sequence 108 of the respective chroma word 102 of the first short audio fingerprint, and finds the index key 202 matching that first multi-byte sequence 108. For example, if the chroma word 102 of the first short audio fingerprint is b214|b255|b008|b047, the matching index key 202 is the index key 2024 (b214|b255|b008) depicted in FIG. 3.

As it is depicted on FIG. 2, set 2004 of posting lists correspond to the index key 2024. The server 720 retrieves that set 2004 of posting lists. Then, the server 720 retrieves the following byte 110 of the respective chroma word 102 of the first short audio fingerprint, and finds the corresponding sorting key 302 matching that following byte 110 of the chroma word 102 of the first short audio fingerprint.

For example, if the chroma word 102 of the first short audio fingerprint is b214|b255|b008|b047, the matching sorting key 302 will be the sorting key 302 (b047) depicted in FIG. 3. Using that sorting key 302, the server 720 retrieves the posting list 304 for the chroma word b214|b255|b008|b047.

Then, at step 508, having the corresponding posting list 304 retrieved, the server 720 can find and select the audio tracks where the chroma word b214|b255|b008|b047 happens to appear. The candidate audio track can be found, as a non-limiting example, by using track ID' 402 containing in the posting list of the respective indexed chroma word 102. As the same chroma word 102 can be found in several different indexed audio tracks, several respective indexed audio tracks, having several respective track ID's 402, can be selected as candidate audio tracks. Thus, for one chroma word 102 of the first short audio fingerprint several candidate audio tracks can be selected.

At step 510, the server 720 repeats steps 504 to 508 for each chroma word 102 of the first short audio fingerprint. When additional candidate audio tracks are determined responsive to the search performed with regard each next chroma word 102 of the first short audio fingerprint, these additional audio tracks shall be added to a plurality of the candidate audio tracks. Thus, the plurality of the candidate audio tracks can comprise all the audio tracks, each candidate audio track having at least one chroma word 102 which chroma word 102 matches any one of the plurality of chroma words 102 of the first short audio fingerprint. It is possible, that some of candidate audio tracks comprise a higher (or a lower) number of chroma words matching the chroma words 102 of the first short audio fingerprint.

The method 500 then terminates.

Figure 6:
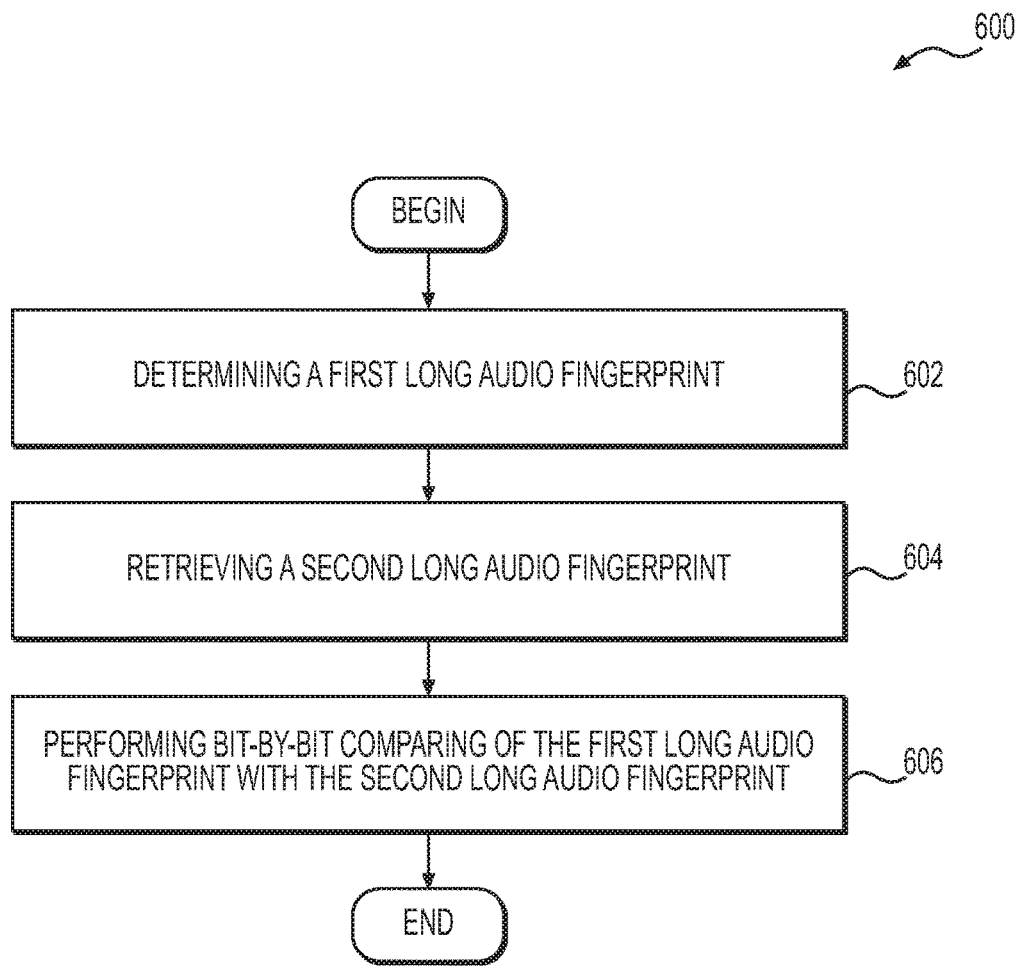
FIG. 6 is a block diagram depicting a method 600, the method 600 of validating the candidate audio track against the first audio track, the method 600 implemented according with non-limiting embodiments of the present technology.

FIG. 6 is a block diagram depicting a method 600, the method 600 of validating the candidate audio track against the first audio track, the method 600 implemented according with non-limiting embodiments of the present technology.

The method 600 begins at step 602, where the server 720 determines a first long audio fingerprint, the first long audio fingerprint being an audio fingerprint of a second portion of the first incoming audio track. The server 720 determines a second long audio fingerprint using track ID 402 which was identified at step 508.

As it was mentioned above, several second long audio fingerprints can be found if the same chroma word 102 was be found in several different indexed audio tracks.

Then, the method proceeds to the step 604.

At step 604, the server 720 retrieves a second long audio fingerprint, the second long audio fingerprint being an audio fingerprint of a second portion of the candidate audio track.

As it was shown in the description of the method 500, the server 720 determines the first short audio fingerprint consisting of chroma words and, using the pruning index 724, finds track ID of the audio track, which contains chroma word, which is present in the first short audio fingerprint. Thus, method 500 allows determining a candidate audio track and its track ID 402. As a person skilled in the art would understand, there can be found more than one candidate audio track and, consequentially, more than one track ID 402

The long audio fingerprint of the candidate audio track is stored in a validation index 726 with other long audio fingerprints of other tracks.

The validation index 726 can be built for a plurality of long audio fingerprints. The validation index is used for validation of audio tracks again the incoming audio track. Long fingerprints can be stored in the validation index 726 as one single record, one long fingerprint after another long fingerprint. In the beginning of each long fingerprint, a multi-byte sequence indicating the length of the following long fingerprint can be located. In this implementation of the present technology, multi-byte sequence indicating the length of the following long fingerprint is a sequence of two bytes.

The server 720 retrieves a second long audio fingerprint using track ID 402.

Retrieving can be effected from a fingerprint file 730. Retrieving can be effected as follows.

The validation index 726 can comprise key file 728 and fingerprint file 730.

Fingerprint file 730 can comprise a sequence of second long fingerprints. In this implementation of the present technology, second long fingerprints are placed in the fingerprint file 730 one after another, without separators. In this implementation of the present technology, each second long fingerprint in the fingerprint file 730 begins with two first byes describing duration of the corresponding fingerprint.

Key file 728 can comprise track ID's (not depicted on FIG. 7) associated with a respective audio track in the fingerprint file 730, and having references to beginnings of long fingerprints in the fingerprint file 730, which beginnings are, in the present implementation of the present technology, two first bits describing duration of the corresponding fingerprint.

As it was described above, when executing steps of the method 500, the server 720 has determined the candidate audio track, using the pruning index 724, and has found its track ID. To retrieve the second long audio fingerprint from the fingerprint file 730, the server 720 can use the track ID 402 which was identified at step 508. The server 720 can find the same track ID 402 in the key file 728, and then to find the beginning of the second long fingerprint in the fingerprint file 730.

Thereafter, the server 720 reads two bytes in the beginning of the corresponding second long audio fingerprint and appreciates the duration of the second long fingerprint from these first two bytes of the second long fingerprint in the fingerprint file 730, and retrieves the second long audio fingerprint.

Then, the method proceeds to the step 606.

At step 606, the server 720 performs bit-by-bit comparing of the first long audio fingerprint with the second long audio fingerprint. Once at least one of the plurality of second long audio fingerprints is matching the first long audio fingerprint on the stage of the bit-by-bit comparing, a candidate audio track is deemed validated.

In some implementations, however, to deem the candidate audio track being matching the first audio track, the absolute match of both audio fingerprints established by bit-by-bit comparing is not necessary. Two audio fingerprints can be deemed to be matching even if a certain number of bits is not matching. For example, it could be predetermined that the audio fingerprints are matching if in the plurality of bits one bit from sequence of 32 bits in each audio fingerprint is not matching.

Additionally or alternatively, incoming audio track and candidate audio track can be of different durations. This can occur when the incoming audio track is missing a beginning or the end of the audio track, or of there is several seconds of silence in the beginning of the incoming audio track. Even if all the bits of audio fingerprints of both audio tracks will not be identical, these audio tracks can be deemed matched.

In some implementations, determining that the candidate audio track does not matched candidate to the first incoming audio track is effected responsive to the track duration varying by more than a pre-set value. For example, if the pre-set value is 30 seconds, otherwise matching candidate will be deemed not to be a matching candidate, if its duration varies by more than 30 seconds compared to the incoming audio track.

Therefore, in some implementations, determining candidate audio track comprises comparing respective track duration of the first incoming audio track and the candidate audio track. As a non-limiting example, the track duration of the candidate audio track can be retrieved from the posting list 304 using track ID 402 associated with an audio track and an indication 404 of track duration information associated with an audio track. Indication 404 of track duration information can be a single byte or can be a multi-byte sequence. In this implementation of the present technology, indication 404 of track duration information is a sequence of two bytes.

The method 600 then terminates.

In some implementations, the candidate audio track comprises a plurality of candidate audio tracks and wherein the method further comprises selecting a sub-set of the plurality of candidate audio tracks based on a pre-set candidate threshold number. The pre-set candidate threshold number can be a pre-determined minimal number of matching chroma words 102 in the first short audio fingerprint and in the second short audio fingerprint, wherein the pre-determined minimal number of matching chroma words depends on the number of pre-selected candidates and on number of matching chroma words in pre-selected candidates. For example, if in a large plurality of pre-selected candidates a large number of pre-selected candidates have two or more matching chroma words, the pre-set candidate threshold number can be established as 2, or 3, or 4 and so on chroma words. Thus, if the pre-set candidate threshold number can be established as 3 chroma words, the sub-set of the plurality of candidate audio tracks will include these second large audio fingerprints each of these second large audio fingerprints having minimum 3 chroma words 102 matching a chroma word 102 from the first large audio fingerprint.

In some implementations the bit-by-bit comparing of the first long audio fingerprint with the second long audio fingerprint comprises shifting the first long audio fingerprint relative to the second long audio fingerprint. The shifting the first long audio fingerprint relative to the second long audio fingerprint is of use when the incoming audio track is cropped in the beginning, or which beginning comprises several seconds of silence, noise, interferences etc. In some implementations, the shifting comprises an amplitude of a shift. For example, the amplitude can ranges between plus 20 seconds and minus 20 seconds, or between plus 15 seconds and minus 15 seconds.

In some implementations, determining that the beginning portion of the second chroma word is identical to the beginning portion of the first chroma word is executed by determining that an entire sequence of bytes in the beginning portion of the second chroma word matches an entire sequence of bytes in the beginning portion of the first chroma.

In some implementations, at least one of the short audio fingerprint and the long audio fingerprint contains an indication of a track ID 402 associated with a respective audio track.

In some implementations, the method comprises, prior to the determining the first short audio fingerprint, receiving, by the server 720, at least a portion of the first incoming audio track. Receiving can be effected, for example, when a user of a computer device uploads the new audio track on a social network or to another location which is accessible by the server 720.

In some implementations, retrieving of the second short audio fingerprint comprises retrieving using an index. As a non-limiting example, the index can be the audio track inverted index. More particularly, the audio track inverted index 724 can be a validation index 726.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of maintaining an audio track inverted index, the method comprising:
   receiving an audio track to be indexed;
   determining an audio fingerprint of the audio track to be indexed;
   determining a first chroma word associated with the audio track to be indexed and being part of the audio fingerprint, the first chroma word being split into a plurality of bytes, the first chroma word comprising a beginning portion of the first chroma word, the beginning portion of the first chroma word being a sub-plurality of bytes having a first byte and a following byte, the first byte being a first multi-byte sequence, the following byte located immediately after said first byte;
   accessing the audio track inverted index, the audio track inverted index comprising a plurality of sets of posting lists, each posting list within the plurality of sets of posting lists being a posting list associated with a chroma word, each chroma word being associated with a unique posting list within the plurality of sets of posting lists, wherein each posting list associated with chroma words having a same first byte and a different following byte within the beginning portions of the chroma words is grouped into a given set of posting lists of the plurality of sets of postings lists, the given set of posting lists representing the first multi-byte sequence of the same first byte and comprising more than one posting lists, the different following byte being unique for each posting list amongst the more than one posting lists;
   based on the first byte, determining a specific set of posting lists within the plurality of sets of posting lists, the specific set of posting lists containing posting lists associated with chroma words having the same first byte as the first chroma word;
   responsive to the following byte of the first chroma word matching the following byte of any chroma word associated with a given posting list within the specific set of posting lists, storing an indication of the audio track in the given posting list;
   responsive to the following byte of the first chroma word not matching the following byte of any chroma word associated with any posting list within the specific set of posting lists, creating a new posting list associated with the first chroma word within the specific set of posting lists and storing an indication of the audio track in the new posting list.

2. The method of claim 1, the first multi-byte sequence being the sequence of bytes in the beginning of the beginning portion of the first chroma word, the number of bytes being pre-determined.

3. The method of claim 1, wherein the following byte is a second multi-byte sequence, the second multi-byte sequence being the sequence of bytes following the first byte of the first chroma word, the number of bytes in each second multi-byte sequence being pre-determined.

4. The method of claim 1, wherein the audio fingerprint is any one of a short audio fingerprint of a first portion of the audio track, the first portion of the audio track being of a first predetermined duration from a start of the audio track, and a long audio fingerprint of a second portion of the audio track, the second portion of the audio track being of a second predetermined duration from the start of the audio track.

5. The method of claim 4, wherein the first predetermined duration is a lesser one of:
   a predetermined duration within a time range from 9 to 27 seconds, and
   an audio track duration.

6. The method of claim 5, wherein the first predetermined duration is a lesser one of:
   21 seconds, and
   the audio track duration.

7. The method of claim 4, wherein the second predetermined duration is a lesser one of:
   a predetermined duration within a time range from 96 to 141 seconds, and
   the audio track duration.

8. The method of claim 7, wherein the second predetermined duration is a lesser one of:

120 seconds, and the audio track duration.

9. The method of claim 1, wherein said chroma word describes a chunk of the audio track, duration of the chunk of the audio track being within time range from ½ second to 8 seconds.

10. The method of claim 9, wherein said duration of the chunk of the audio track is 3 seconds.

11. The method of claim 1, wherein each of said chroma words is associated with an indication of a track ID associated with a respective audio track.

12. The method of claim 1, wherein each of said chroma words is associated with an indication of a track duration information associated with a respective audio track.

13. The method of claim 11, wherein the track ID is described with one byte which is located after any one of:

the following byte, and a second multi-byte sequence.

14. The method of claim 12, wherein the indication of a track duration is described with one byte which immediately follows any one of:

the following byte, and a second multi-byte sequence.

15. The method of claim 4, wherein the short audio finger print is stored in an audio track inverted index, which audio track inverted index is executed as a pruning index, the pruning index being built for a plurality of short audio fingerprints.

\* \* \* \* \*